United States Patent [19]

Webb

[11] Patent Number: 4,768,101

[45] Date of Patent: Aug. 30, 1988

[54] HALF-TONE REPRODUCTION METHOD EMPLOYING OVERLAPPING SCAN LINES

[75] Inventor: Graham Webb, Hertfordshire, England

[73] Assignee: Crosfield Electronics (USA) Limited, London, England

[21] Appl. No.: 52,329

[22] Filed: May 21, 1987

[30] Foreign Application Priority Data

May 30, 1986 [GB] United Kingdom ............... 8613223

[51] Int. Cl.⁴ .............................................. H04N 1/21
[52] U.S. Cl. .................................... 358/298; 358/283
[58] Field of Search ............... 358/280, 283, 285, 298, 358/296

[56] References Cited

U.S. PATENT DOCUMENTS

| | | | |
|---|---|---|---|
| 1,688,081 | 10/1928 | Ives ....................... | 358/296 |
| 3,876,829 | 4/1975 | Schreiber ................ | 178/7.3 D |
| 4,025,189 | 5/1977 | Pugsley .................. | 358/298 X |
| 4,110,796 | 8/1978 | Aughton ................. | 358/298 |
| 4,314,261 | 2/1982 | Martinage .............. | 358/298 X |
| 4,363,037 | 12/1982 | Taudt .................... | 358/296 |
| 4,623,972 | 11/1986 | Darby et al. ........... | 358/298 X |
| 4,628,366 | 12/1986 | Yamada ................. | 358/298 X |
| 4,647,962 | 3/1987 | Rosen et al. ........... | 358/298 X |

FOREIGN PATENT DOCUMENTS

| | | |
|---|---|---|
| 0047145 | 3/1982 | European Pat. Off. . |
| 0151353 | 8/1985 | European Pat. Off. . |
| 2208257 | 6/1974 | France . |
| 321389 | 11/1929 | United Kingdom . |

Primary Examiner—Clifford C. Shaw
Attorney, Agent, or Firm—Sughrue, Mion, Zinn, Macpeak, and Seas

[57] ABSTRACT

A method of generating a half-tone representation of an image from digital data defining the color content of pixels arranged in a series of substantially parallel, overlapping input scan lines comprises exposing at least one record medium to an exposing beam in a series of substantially parallel, overlapping output scan lines each corresponding to a respective input scan line. The exposing beam is modulated under the control of the digital data and half-tone information. The intensity of the exposing beam, which typically includes a number of subsidiary beams, is such that an area of the record medium will only record a half-tone dot or a portion of a half-tone dot after all output scan lines passing through that area have been exposed.

4 Claims, 7 Drawing Sheets

HALF-TONE REPRODUCTION METHOD EMPLOYING OVERLAPPING SCAN LINES

FIELD OF THE INVENTION

The invention relates to methods for generating a half-tone representation of an image.

DESCRIPTION OF THE PRIOR ART

Conventional electronic scanners, such as our Crosfield Magnascan 645, scan an original image in a series of substantially parallel and abutting input scan lines, the resultant signals being regularly sampled, each sample corresponding to an individual pixel. The colour content of each pixel is determined and defined in terms of digital data which is then optionally modified and stored or fed directly to an output scanner. The output scanner generates an exposing beam which scans a record medium in a series of substantially parallel and abutting output scan lines. The exposing beam is modulated under the control of the digital data and half-tone information so that a series of half-tone dots are recorded on the record medium, the size of the dots corresponding to the colour content of the corresponding pixels in the original image used to define the area corresponding to the dot. Typically, one half-tone dot will correspond to four pixels in the orignal image. In the case of coloured images, the half-tone representation will comprise two or more, usually four, colour separations corresponding to the printing inks cyan, magenta, yellow and black.

An example of an electronic scanning system is described in detail in EP-A-0047145.

When reproducing graphics information, typical pixel densities used are 300×300 pixels per inch. In some cases, this density is too low or coarse and results in the edges of image features having a visible, step like form. This is undesirable. To improve this, it would be desirable to increase the output screen ruling ie. the number of half-tone dots per inch, increase the number of subsidiary beams making up the exposing beam, or increase the number of subsidiary beams used to expose a half-tone dot. Unfortunately, all these parameters are set by conventional printing equipment and would require modification of that printing equipment.

SUMMARY OF THE INVENTION

In accordance with the present invention, a method of generating a half-tone representation of an image from digital data defining the colour content of pixels arranged in a series of substantially parallel, overlapping input scan lines comprises exposing at least one record medium to an exposing beam in a series of substantially parallel, overlapping output scan lines, each corresponding to a respective input scan line, the exposing beam being modulated under the control of the digital data and half-tone information, and the intensity of the exposing beam and the nature of the record medium being such that an area of the record medium will only record a half-tone dot or a portion of a half-tone dot after all output scan lines passing through that area have been exposed.

The invention improves the reproduction of the edges of image features and the like by defining the image in terms of pixels arranged in a series of overlapping scan lines. This increases the graphics line rate but maintains the screen grid unchanged so that the resultant representation is satisfactory for use with conventional printing equipment. Furthermore, no modifications are required to the optical components of conventional scanning apparatus used to carry out the method.

A further significant advantage of the invention is that by providing overlapping output scan lines, any differences between the apparent colour content of pixels due to noise and the like is averaged out on the record medium this removing the need for complex electronics to produce this averaging.

It should be understood that by "image" we include both graphics and text images.

Preferably, a typical output scan line will overlap only the preceding and succeeding scan lines. However, a higher degree of overlap is also feasible but will result in longer exposure times.

Typically, the intensity of the exposing radiation beam will be reduced by about 40% or more from that used in conventional systems without overlapping scan lines. The degree of reduction is determined empirically and depends primarily on the number of times a scan line is overlapped and on the response of the record medium. Typical record media exhibit a threshold such that when they are exposed to a beam having an energy above the threshold they will exhibit a significant density change whereas when they are exposed to a beam having an energy below the threshold, only a very small change in density will occur. Since these effects are additive, the effect of reexposing the same portion of the record medium a number of times will result in a change in density corresponding to that which would have occurred if the record medium had been exposed to a single beam having an energy approximately equal to the sum of the energies of the rescanning beams.

Preferably, the exposing beam comprises a number, conveniently six, of subsidiary beams which may be modulated together or separately in response to the digital data and half-tone information.

The record medium may comprise a radiation sensitive sheet or the like or for example a gravure cylinder which is etched by the exposing beam.

The digital data may have been generated electronically but preferably is generated by scanning an original image in a series of substantially parallel, overlapping input scan lines, each scan line being defined by a plurality of pixels; determining the colour content of each pixel; and representing the determined colour content, possibly after modification, in a digital form.

BRIEF DESCRIPTION OF THE DRAWINGS

An example of a method in accordance with the present invention of generating a half-tone representation of an original image using a conventional half-tone reproduction system will now be described with reference to the accompanying drawings, in which.

DETAILED DESCRIPTION OF AN EMBODIMENT

Figure 1:
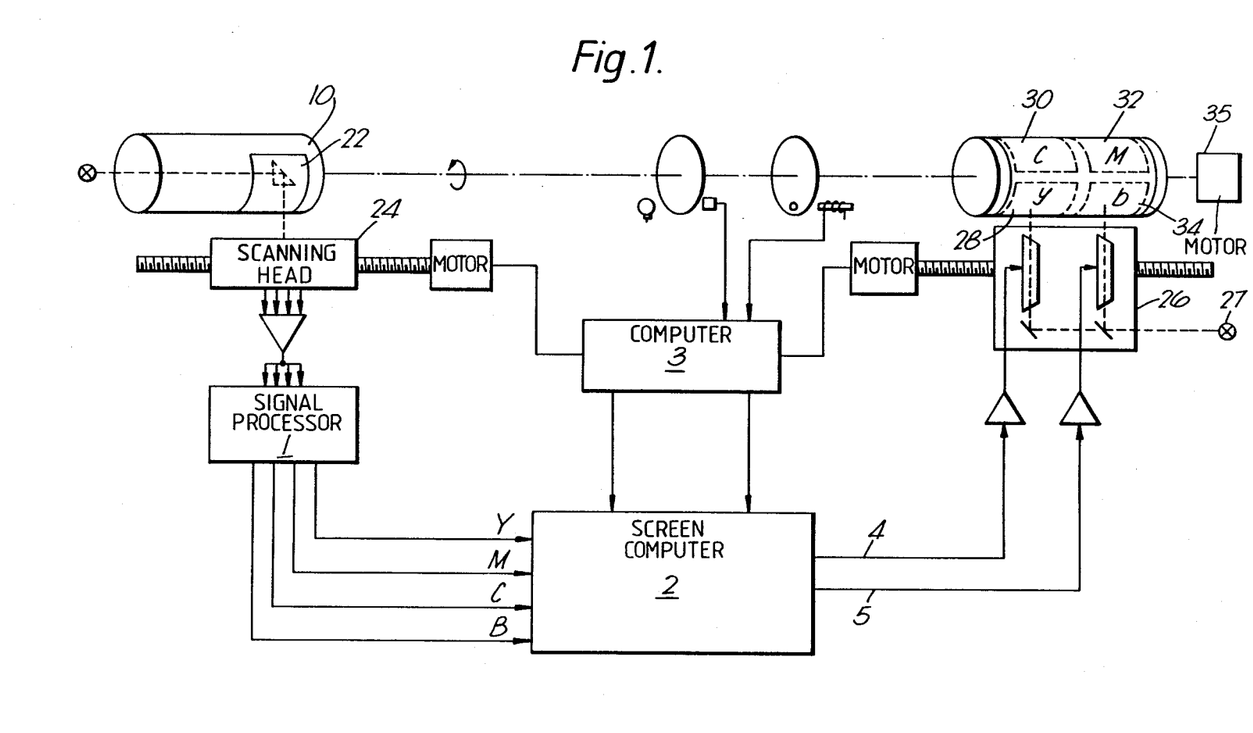
FIG. 1 is a schematic diagram of a conventional half-tone reproduction system.

Conventional apparatus for producing half-tone colour separations from an original image generally comprises at least two rotating coaxial drums as shown in FIG. 1. An original 22 is wrapped round one drum 10 and record media defining output surfaces 28,30,32,34 which are to be exposed are wrapped round another drum 11 or drums, the drums being in this case driven by a common motor 35. The output surfaces for the different colour separations may occupy successive sections (eg.28,30) of the perimeter of one output drum, they may be relatively displaced (as at 30,32) along the axis of the drum, or they may be arranged on different drums. The original image is scanned by an opto-electronic scanning head 24 by rotating its drum 10 past the head 24 and imparting in addition a slow longitudinal movement to the head so that the scanning path on the surface of the cylindrical drum is helical. Signals from the scanning head then pass through a colour corrector (signal processing unit) 1, if necessary, in which a fourth signal, black is also usually generated, and emerge as the "picture signals" yellow (Y), magenta (M), cyan (C), black (B) for that particular colour. The output surfaces, which are sensitive to light from an exposing head 26 adjacent to the other drums, are scanned by the exposing head in a similar manner, and are exposed progressively to a set of six laser beams to generate a half-tone pattern made from dots of a size depending on the colour tonal density of the original.

In another system (not shown) the cylinders 10, 11 are separately driven and are not coaxial while a single expose head is provided with the colour separations 28, 30, 32, 34 spaced circumferentially around the cylinder 11.

Figure 2:
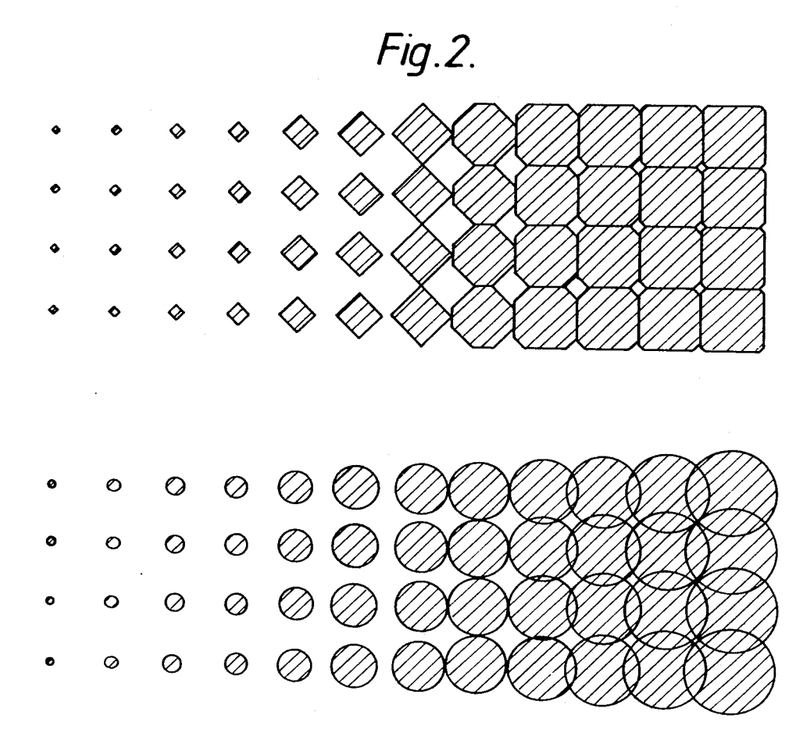
FIG. 2 shows how increasing the size of the dots in a half-tone pattern gives a denser image.

Movement of the scanning and exposing heads 24, 26 is achieved by rotating respective lead screws 50,52 on which the heads are mounted. Each lead screw 50,52 is rotated by a respective motor 54, 56 controlled by a computer 3. The computer 3 also monitors the rotational positions of the drums 10, 11 via conventional timing discs 58 and optical detectors 60. Examples of half-tone patterns are shown in FIG. 2, in which the tonal density increases from left to right. The signals 4, 5 controlling the modulation of light from a source 27 are obtained from a screen computer 2 fed with the colour component signals Y, M, C and B.

Figure 3:
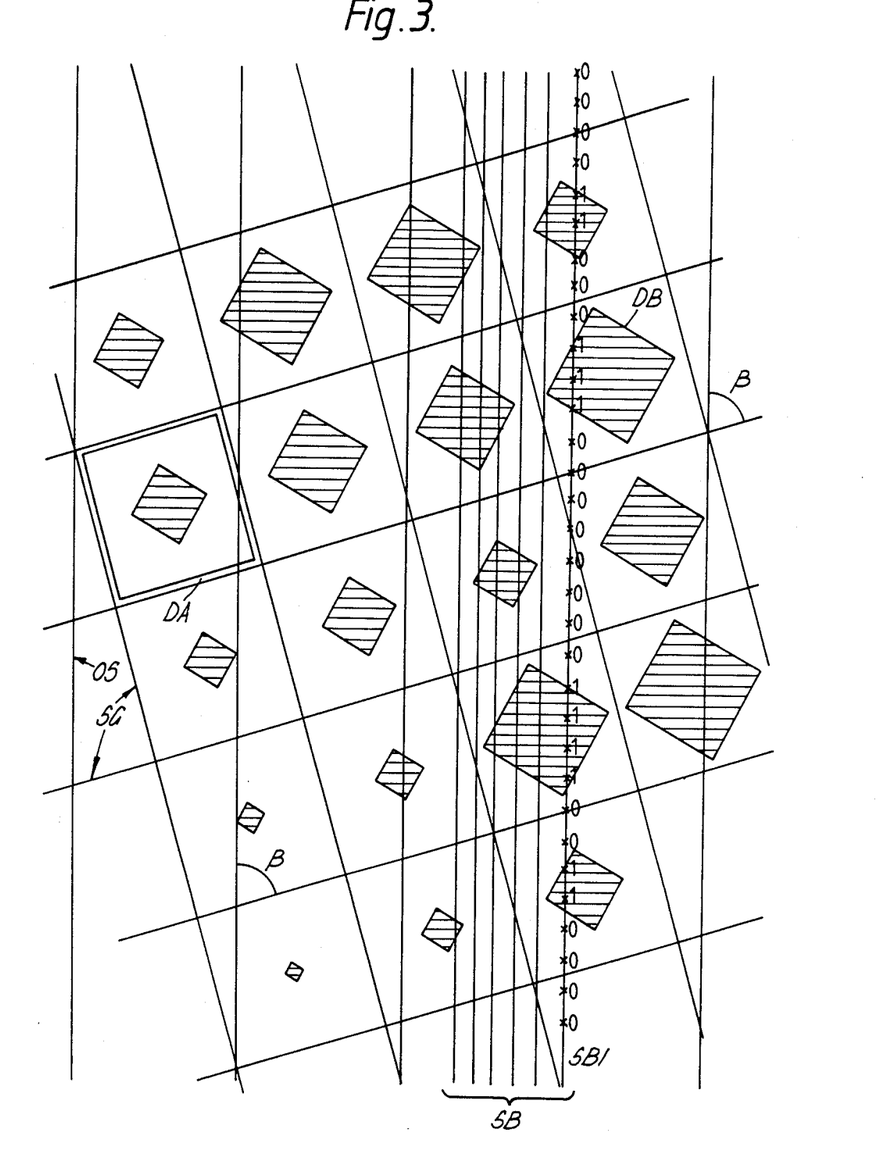
FIG. 3 is a sketch showing the idealised output surface on which is superimposed a screen grid at an angle $\beta$ and in which the scan lines abut in a conventional manner.

Referring now first to FIG. 3, vertical lines in the output surface (OS) are perpendicular to the drum axis, and horizontal lines are parallel to the drum axis, so that the helical path of the exposing head, ie. the scanning beam, is very closely parallel to the vertical lines. For a screen angle $\beta$, the dots are created in a screen grid (SG) at the angle $\beta$ to the output surface (OS). Examples of the paths of the scanning beam are shown as SB. At each point of the SB1 line marked with a cross, for example, the picture signal is determined, which dictates the size of the dot required to represent the particular level of tonal density at the corresponding point in the original image. This dot size may vary over the region as indeed shown in FIG. 3 hence the different sizes of the dot. It may even vary within one dot area (DA), which would lead to a distorted dot. The dots shown in FIG. 3 by way of example are square dots "tilted" at 45° to the grid, the shaded areas being bounded by the dot borders (DB). The patterns of dots shown may be created on the output surface by controlling the scanning beam by an "on/off" signal in accordance with whether the scanning beam lies over a dot ("on") or a space ("off") in the overlying screen grid. At each point marked x, the value of this signal is indicated by "1" or "0". The signal is obtained subsequently for all similar points along the helical path SB of the scan which overlie the output surface.

It is emphasised that the screen grid is an artificial device to aid the description of the working of the computer. No real dot screen exists.

Figure 4:
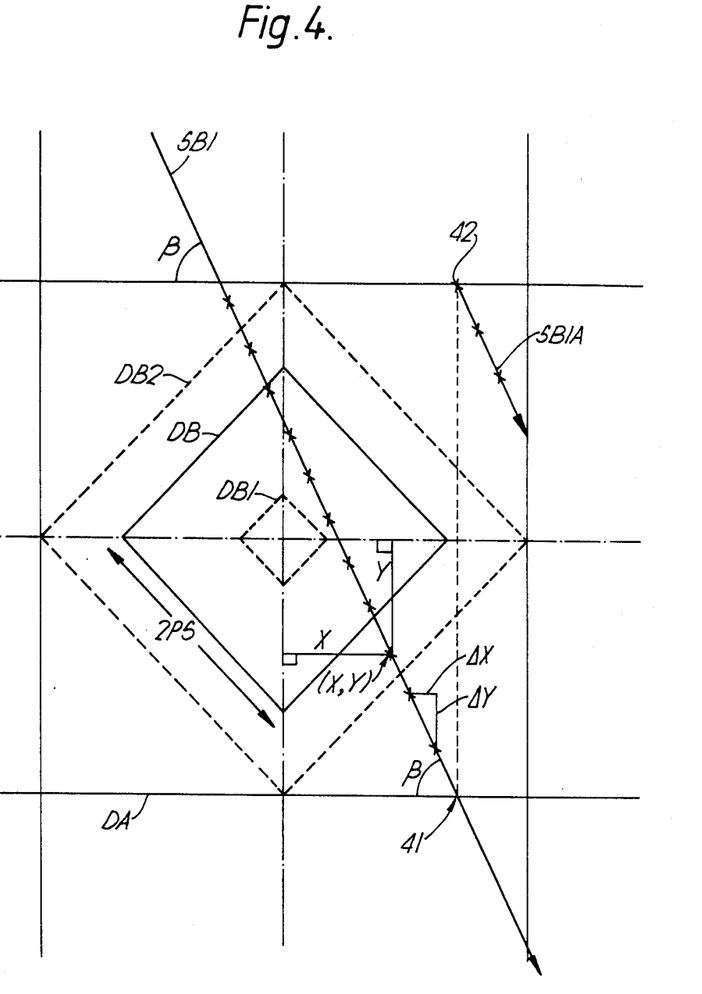
FIG. 4 shows one dot area of the screen grid in FIG. 3.

Referring now to FIG. 4, one dot area is shown in dotted lines. The diagram has been rotated through the screen angle $\beta$ relative to the diagram of FIG. 3. A dot bounded by the border DB2 is 50% the maximum dot size. A small dot might have a border DB1, but from now on an intermediate dot size will be assumed, the dot having a border DB. It is useful to equate the value of the picture signal (PS) with half the dot width: in this way the picture signal is seen to determine the dot size directly.

The position x of the "write" scanning beam relative to a dot area (DA) and a dot border (DB) is described by two position signals. These may be relative to coordinate axes (X,Y) aligned with the dot area boundaries as shown, or axes at 45° to the dot area boundaries for example. Each time a timing signal indicates that the scan has progressed to the next point, the next point x of the scanning beam relative to the screen grid is computed by adding increments $\Delta X$ and $\Delta Y$ to the previous position signals X and Y. Of course $\Delta X$ and $\Delta Y$ are determined by the screen angle $\beta$ and by the desired line spacing. The degree of magnification of the final screen grid can be controlled by the size of the increment. $\Delta X$ and $\Delta Y$ are added many times during the traversal of one dot area. The values of the increments determine the screen angle, and may be changed at the beginning of each new vertical scanning lines, ie. at the edge of the separation.

It is also possible to adjust in a regular manner the values of the increments at the crossing of each dot border, so as to increase greatly the number of possible screen angles and rulings. If $\Delta X$ and $\Delta Y$ for example, were constant, then the number of possible screen angles and rulings would be limited by the accuracy to which $\Delta X$ and $\Delta Y$ are defined, ie. by the number of bits describing $\Delta X$ and $\Delta Y$. The accuracy to which $\beta$ would be defined would be the ratio:

$$\frac{\text{(maximum value of } \Delta X (\text{or } \Delta Y))}{\text{(minimum change in } \Delta X (\text{or } \Delta Y))}$$

However, by adjusting $\Delta X$ and $\Delta Y$ periodically as the dot borders are crossed, and thus alternating the screen angle between two (or more) very close values, the average overall screen angle can be made to assume intermediate values. The precision in the determination of $\beta$ is then $$\frac{\text{(sum of all the }\Delta X\text{(or }\Delta Y\text{) over the whole dot area)}}{\text{(minimum change in }\Delta X\text{(or }\Delta Y\text{))}}$$

and the same precision is available in the determination of the screen ruling. This improvement may be by a factor of 60, for example, if the position is corrected at every dot area, or of 120 if it is corrected at alternate dot areas.

Figure 5:
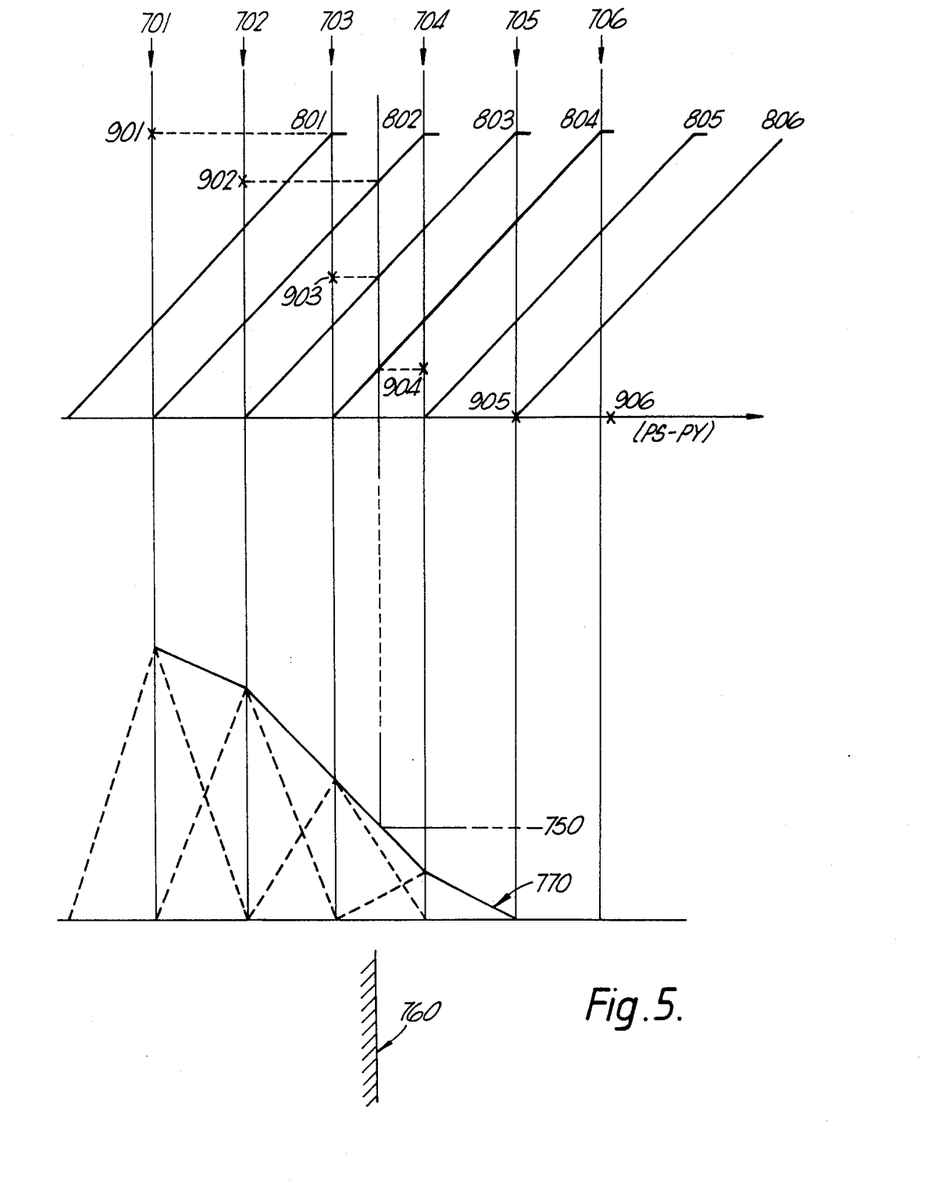
FIG. 5 is a diagram showing how six scanning beams interact to produce a "soft dot" profile.
Figure 7:
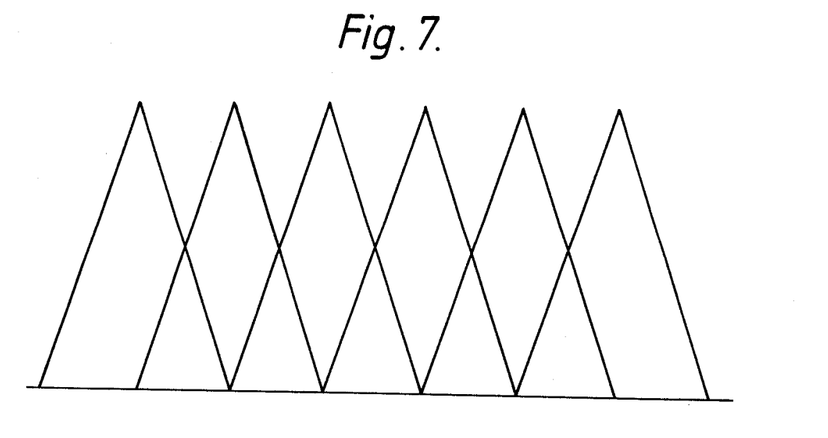
FIG. 7 shows six subsidiary scanning beams in overlapping relationship to define an exposing beam.

The intensity profile, provided by six, simultaneously generated parallel beams, over the edge of a "soft" dot, is illustrated schematically in FIG. 5. The individual intensity profile of each beam can be represented and treated as triangular in shape, rising to a sharp peak at the centre. This is an approximation to the Gaussian variation of intensity produced in practice by a laser optical system, as is known in the art. The beams are arranged across the output surface with an equal spacing in the horizontal direction, so that their intensity profiles overlap, as shown in FIG. 7. In FIG. 7, all the beams are modulated to the same level of intensity, but in practice they will be different, as shown in FIG. 5, in regions where the required density is varying, such as over a dot border.

Figure 6:
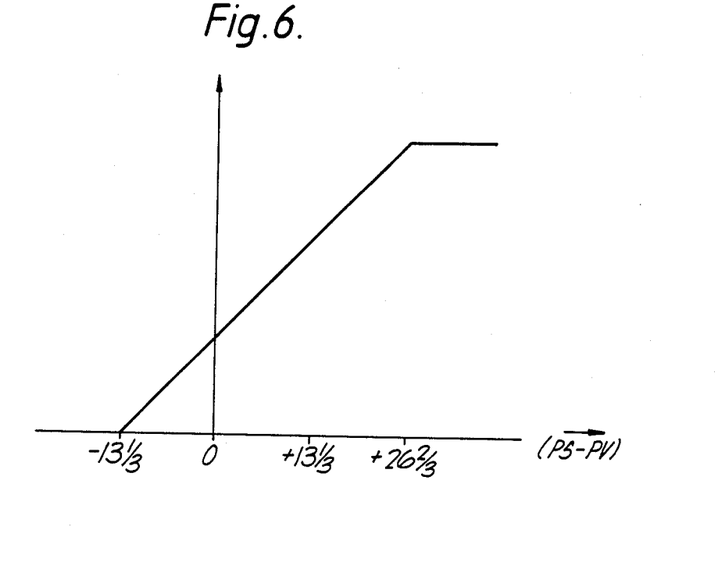
FIG. 6 shows the variation of the scanning beam intensity with distance from the required dot border.

The index signal I for a given scanning beam may be, for example, the difference between the picture signal PS and a position signal PV, shown as PS-PV in FIG. 6 in which the horizontal axis represents PS-PV in volts. At the point where PS-PV=0, the required intensity of the beam should be exactly at the threshold level of a photographic film used as the output surface. This is the position of the edge of a dot, the contour of PS-PV=0 on the screen grid being called the dot border or dot edge. In regions just outside the dot border, to the right of the vertical axis in FIGS. 5 and 6 the intensity of the scanning beam is below the film threshold value; in regions inside the dot border, it is above the threshold value. In the darkest regions, eg. at the centre of a dot, the level preferably exceeds 200% of the film threshold value, and may even reach 300%. The variation of the beam intensity, as shown in FIG. 6, is preferably a linear function of the distance of the beam from the dot border, varying between a zero value and a maximum value.

In FIG. 5, the vertical axis represents beam intensity, and the horizontal axis PS-PV, as in FIG. 6. The dot border 760 is shown at the bottom of the Figure. A first scanning beam 701 is controlled by a first position computer and dot border computer. When it is at the relative position on the screen grid shown in the Figure, the intensity function 801 requires that for such a large negative value of PS-PV the intensity should be at the maximum value, 901. The resulting contribution made by beam 701 to the overall intensity 770 is shown in dotted lines. A second beam 702 gives an intermediate level of intensity 902, as determined by the intersection of curve 802 with the vertical axis. The remaining four beams, 703 to 706, provide levels of intensity 903 to 906 in accordance with the curves 804 to 806, respectively.

The slope of the intensity curve 770 defining the profile of the dot is arranged to be sufficiently steep at the point 750 that the film threshold level is exceeded, that the dot border is well defined and does not vary substantially with small regional variations in the film threshold value. The slope of the curve 750 should not be so steep that the dot so produced is not etchable, ie. does not change its size gradually with the application of a chemical etching agent on the resulting film.

The scanning system described is shown and described in more detail in EP-A-0047145 incorporated herein by reference.

Figure 8:
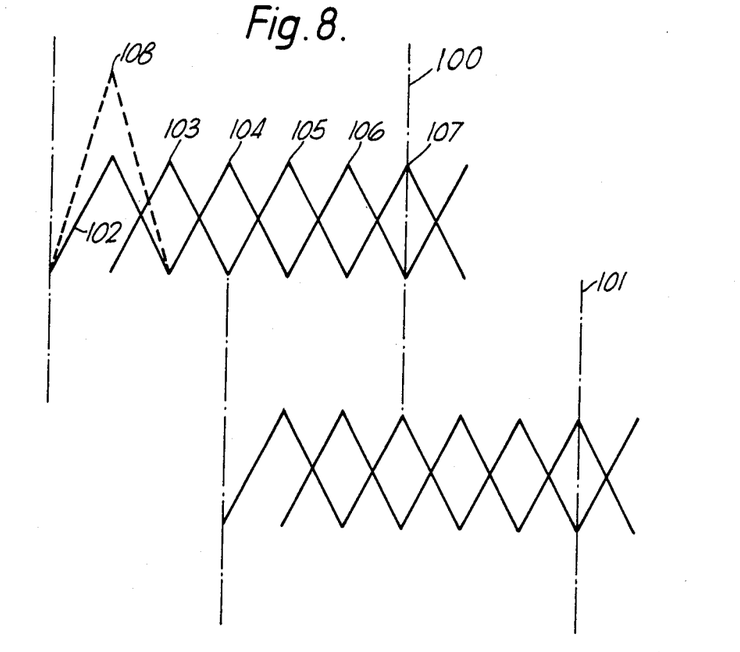
FIG. 8 illustrates the intensities of the subsidiary scanning beams in a pair of overlapping output scan lines.

In the conventional system described, each input and output scan line abuts the preceding and succeeding lines. In the present invention, adjacent input and output scan lines overlap and FIG. 8 illustrates an example in which each scan line overlaps the preceding and succeeding scan lines. In FIG. 8, two output scan lines 100, 101 are shown and it will be seen that one edge 110 of the scanline 101 is positioned in alignment with the centre of the scan line 100. In view of this overlap, each portion of the record medium will be traversed by two output scan lines. The output scan lines can be caused to overlap simply by slowing down the traverse speed of the exposing head 26 by suitably controlling the motor 56. It should be noted that the $\Delta X$ and $\Delta Y$ values at the start of each line would need to be modified.

It should be understood that the input scan lines corresponding to output scan lines 100, 101 will overlap in an exactly similar manner.

In a similar way, the traverse speed of the scanning head 24 is slowed down so that the original 22 is scanned by a series of overlapping input scan lines similar to and having a one to one relationship with the output scan lines 100, 101. The input scan lines are analysed as in the conventional system to generate digital data defining the colour content of each pixel and this digital data is used by the computer 2 (clocked by the computer 3) to control the exposure of the record medium. It should be noted that the pixels overlap.

Since the output scan lines overlap, it is important to modify the conventional intensities of the exposing beams so that the resultant incident intensity of two passes is equivalent to a single conventional pass. The difference between a conventional system and the new system is that greater definition of the dot borders can be achieved by using a double pass system.

FIG. 8 also illustrates the intensity profile for the six subsidiary, exposing laser beams 102-107 and this should be compared with FIG. 7. In FIG. 8, the maximum intensity of each subsidiary beam is about 40% of the maximum intensity that the subsidiary beam would have in the conventional system as illustrated by a dashed line 108. In other words, the profile 108 corresponds to the profile 108 shown in FIG. 7.

Figure 9:
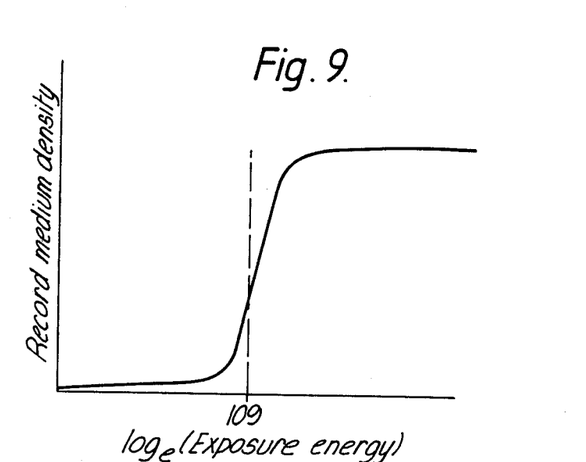
FIG. 9 illustrates graphically the response of a typical record medium to exposing beam energy.

The response of a conventional record medium to exposing radiation is shown in FIG. 9 where it will be seen to exhibit a threshold 109 at a particular total exposure energy. The characteristic of suitable record mediums is such that the effect of exposing the same area of the record medium to more than one beam is equivalent to exposing the area to a single beam having an energy equivalent to the sum of the energies of the repeated beams.

In view of this, it is important that the total energy received by an area of the record medium where no dot portion is to be recorded is less than the threshold 109 but where a dot portion is to be created, the total incident energy is greater than the threshold 109. This is achieved by reducing the maximum intensity of the exposing beams by about 40% of their normal maximum intensities. This is simple to achieve in view of the facility provided in the conventional scanner previously described enabling a "soft dot" profile to be achieved.

I claim:

1. A method of generating a half-tone representation of an image from digital data defining the colour content of pixels of said image arranged in a series of substantially parallel, overlapping input scan lines, the method comprising exposing at least one record medium to an exposing beam in a series of substantially parallel, overlapping output scan lines each corresponding to a respective one of said input scan lines, said exposing beam being modulated under the control of said digital data and half-tone information, and the intensity of said exposing beam and the nature of said record medium being such that an area of said record medium will only record a half-tone dot or a portion of a half-tone dot after all said output scan lines passing through the said area have been exposed.

2. A method according to claim 1, wherein said output scan lines include a first and a last output scan line, and wherein each of said output scan lines apart from said first and last output scan lines overlaps only the preceding and succeeding scan lines.

3. A method according to claim 1, wherein said exposing beam comprises a number of subsidiary beams which may be modulated together or separately in response to digital data and half-tone information.

4. A method according to claim 1, wherein said digital data is generated by scanning an original image in a series of substantially parallel, overlapping input scan lines, each input scan line being defined by a plurality of pixels; determining the colour content of each said pixel; and representing the determined colour content, possibly after modification, in a digital form.

* * * * *